3,425,454
GLASS-RESIN COMPOSITE STRUCTURE
William J. Eakins, Wilbraham, Mass., and Richard A. Humphrey, Somers, Conn., assignors to De Bell & Richardson, Inc., Hazardville, Conn., a corporation of Connecticut
Filed Apr. 16, 1965, Ser. No. 448,818
U.S. Cl. 138—141      5 Claims
Int. Cl. F16l 9/10, 9/14; C03b 37/00

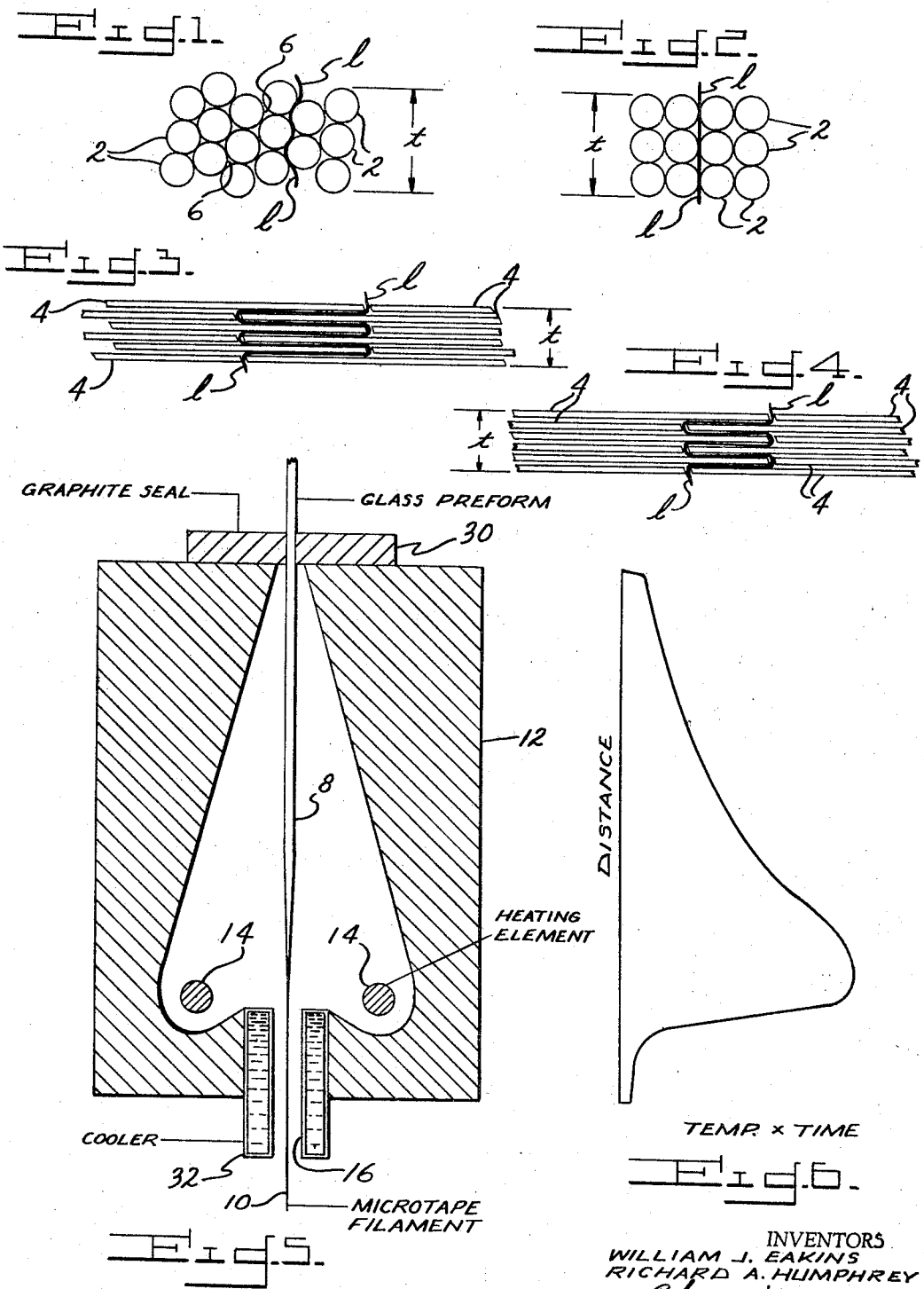

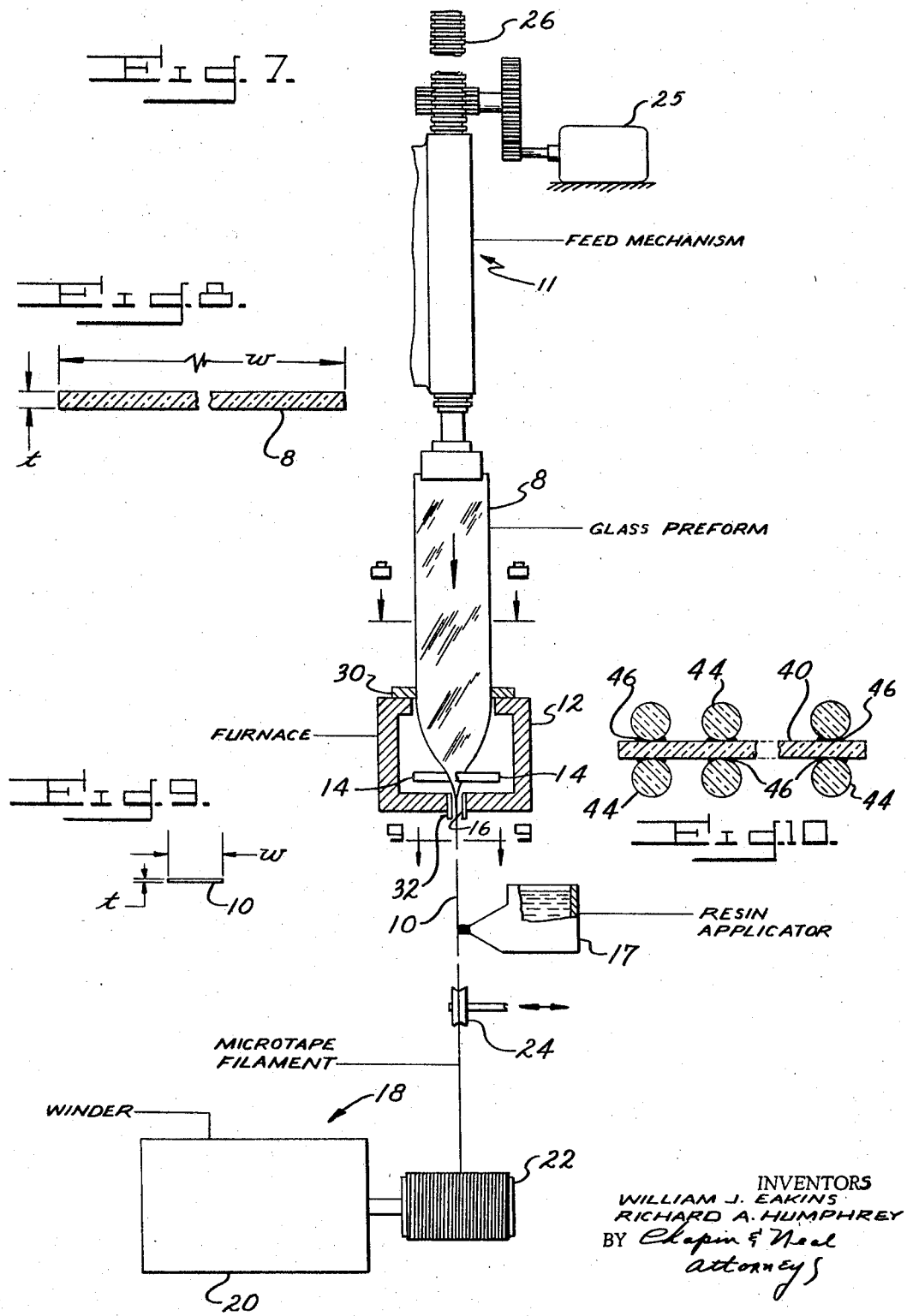

ABSTRACT OF THE DISCLOSURE

A glass resin composite structure bonded with thermosetting resin using thin microtape filament glass of non-circular cross section having substantially greater width than thickness. The glass filaments are overlapped to provide a resin path through the composite wall which is many times the thickness of the wall.

---

This invention relates to reenforcing filaments such as glass filaments used in making glass-resin composite structures. More particularly, the invention relates to filament tapes which permit glass packing geometry not attainable using conventional round filaments.

As is well known, glass filaments and fibers, drawn from molten glass, are widely used as reenforcing material in glass-resin composite structures. Because of the circular cross section of these filaments, the maximum glass content attainable in structures in which they are used is 90.7% by volume. Evidence shows, moreover, that the failure of glass-resin composite structures commences in the non-glass region of the structure and also that fractures of glass filaments tend to occur along lines of contact between adjacent filaments.

While glass-resin structures have many desirable mechanical properties for use in space and underwater environments, fluids, especially gases at low temperatures and/or high pressures, penetrate through the resin phase of glass-resin containers. For example, at cryogenic temperatures the minute hydrogen molecule readily escapes from conventional glass-resin containers through the resin phase thus necessitating special impermeable liners.

The principal object of this invention is to provide an improved method of making filament wound glass-resin structures which minimize the problem of permeability to fluids, particularly at low temperatures and/or high pressures.

Another object of this invention is to provide glass-resin composite structures in which the glass phase consists of filament reinforcement in which the filament is characterized by a width to thickness ratio not less than 10:1, hereinafter referred to as microtape.

A further object of this invention is to provide a method of accurately fabricating microtape.

The above and other objects and advantages of this invention will be more readily apparent from the following description and with reference to the accompanying drawings, in which:

FIGS. 1 and 2 are greatly enlarged diagrammatical cross sectional views showing conventional filament wound structures;

FIGS. 3 and 4 are greatly enlarged diagrammatical cross sectional views showing filament wound structures of the type embodying this invention;

FIG. 5 is a cross sectional view of a furnace used in carrying out this invention;

FIG. 6 is a graph showing the temperature profile developed in the furnace, shown in FIG. 5;

FIG. 7 is an elevational view illustrating the apparatus and method embodying this invention;

FIG. 8 is a section taken along line 8—8 of FIG. 7;

FIG. 9 is a section, on an enlarged scale, taken along line 9—9 of FIG. 7;

FIG. 10 shows an alternate preform configuration for use in making a corrugated microtape.

Figure 11:
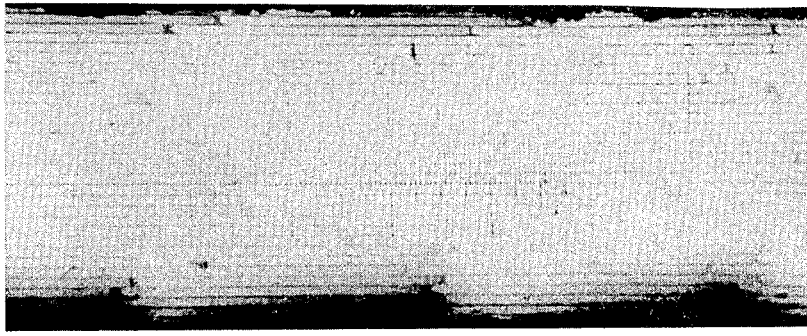
FIGS. 11–13 are microphotographs at approximately 150 magnification illustrative of a few different microtape configurations embodying the invention.

In accordance with this invention, the fluid permeability problem can be minimized by: increasing the resin leakage path length through the wall of glass-resin composite structures, decreasing the number of leakage paths for a given wall length of container, and decreasing the resin content of the structure. Since the permeability of glass to gas is negligible, the use, in place of conventional glass filaments, of relatively wide, thin, flat glass filaments, called microtapes, minimizes fluid leakage. For purposes of this application, microtape is defined as a continuous, non-circular, glass filament having a width to thickness ratio in the range of 10–50 to 1, with a thickness in the range of .0002 to .004 of an inch and when used as a reenforcing material typically .0003 to .0005 inch.

The significance of leakage path length is illustrated by comparison of FIGS. 1, 2, 3 and 4. In FIG. 1 as shown a plurality of round filaments 2 disposed in a perfect hexagonal packing arrangement. In FIG. 2, the filaments 2 are shown disposed in a square packing arrangement. Leakage paths are shown at L in FIGS. 1–4. With square packing the shortest leakage path is equal to the wall thickness $t$ of the structure. In FIG. 1, with hexagonal packing the leakage path lies along ⅓ the periphery ($\pi D$) of each filament. Thus the leakage path length is equal to $\pi/3$ (1.05) times the wall thickness $t$ of the structure.

In contrast, using microtapes 4 with a width to thickness ratio of 50:1 when wound in flat layers in close edge-to-edge relation so that one tape layer is centered over the gap of the underlying layer, as shown in FIG. 3, the leakage path L is equal to:

$$L=\left(\frac{R}{2}+1\right)t;\ L=\left(\frac{50}{2}+1\right)t=26t$$

where R is the width to thickness ratio, and $t$ is the thickness of the structure. Similarly, even if microtape structures were made with a one-third overlap, as shown in FIG. 4, the resulting leakage path L would be:

$$L=\left(\frac{R}{4}+1\right)t;\ L=\left(\frac{50}{4}+1\right)t=13.5t$$

It is thus evident that by using microtape in filament wound structures, leakage path length may be made as much as 25 times greater than perfectly packed, conventional round glass filaments.

In addition to the advantage of improved leakage path length, microtapes drastically reduce the number of leakage paths per unit area of a vessel, hereinafter called leakage path frequency. Thus, for example, a microtape, having a width to thickness ratio of 50 to 1, comprises in effect a unitary glass wall equivalent in coverage to 50 round filaments placed in abutting relation.

In addition to leakage path length and leakage path frequency, the permeability of a glass-resin structure is also dependent upon the cross sectional area of resin in the structure. With good filament winding of microtape, uniform resin layers between microtapes have been obtained of less than .00001 of an inch. In contrast, even with perfect packing as shown in FIG. 1, the tricorn-shaped interstices 6 between the filaments have a minimum average altitude around ⅛ the diameter of the filaments. Thus, considering a standard commercial fiber of .00037 inch, the minimum dimension across a tricorn resin zone could be no less than .000046 inch. It will thus be seen that the resin spacing between conventional filaments is approximately 4½ to 5 times greater than the resin layer attainable between microtapes.

In summary, it has thus been found that the number of leakage paths through a unit area of wall structure can be reduced as much as 50 times by the use of microtapes as compared with conventional filament wound structures. In addition, leakage path length can be increased as much as 25 times, and also the quantity of resin in a cross section of a glass-resin composite structure can be reduced at least 4½ to 5 times that obtainable using round filaments.

In the practice of this invention microtapes are produced by attenuation of a filament from a glass form, called a "preform," such as shown at 8 in FIGS. 5 and 7. The preform is selected or fabricated with a cross sectional configuration to yield a filament of the same cross section as the preform. Thus, for example, to obtain a flat microtape, as shown at 10 in FIG. 9, the preform should be a flat, generally rectangular glass plate.

The glass preform 8 is slowly advanced by a suitable feed mechanism, shown generally at 11 in FIG. 7, into a furnace 12 containing heating elements, such as electrical heater rods 14. The lower end of the furnace has an opening 16 through which the softened glass is drawn by a suitable winding or takeup mechanism, shown generally at 18.

As shown, the winder 18 comprises a motor 20 which rotates a mandrel, drum or cylinder 22 on which is wound the microtape filament 10 for forming tubular products, such as pipe, container and the like. A reciprocable strand guide 24 is slowly reciprocated in parallel relation to the axis of drum 22 to lay the filament accurately in contiguous edge-to-edge relation.

Interposed between the furnace 12 and the takeup drum or cylinder 22 is an applicator 17 by which a suitable thermosetting resin may be and preferably is applied to the filament. Additional resin may also be applied at the drum 22, and if necessary suitable means may be employed to remove excess resin from the surface of the microtape as it is being wound on the drum.

Since glass filaments are inherently friable, they cannot effectively be shaped or formed to a desired cross section by the use of shaping rolls or dies or similar apparatus. It is thus important to form the filament by attenuation, without handling. In order to obtain a perfect microtape which is a micro-reproduction of the preform, it is essential that the glass preform be heated to a temperature between its oftening point and flow point, and preferably to a temperature several hundred degrees above its softening point. It is also important to provide a relatively gradual, tapered heating of the glass, such as shown in FIG. 6, which is a temperature profile of the preform in the furnace. The use of a short heating zone or slot has provided unsatisfactory. On the other hand, too long a duration of the preform at the maximum furnace temperature results in the formation of glass beads from which round filaments are obtained.

Employing the apparatus shown in FIG. 7, microtapes have been successfully made by utilizing a feed mechanism which advances the preform into the furnace at a speed from .25 to 1 foot per minute. The feed mechanism, as shown, comprises a constant speed motor 25 which through suitable gearing linearly drives a rod 26 to vertically advance the preform 8 through the furnace.

Selection of furnace temperatures depends upon the type of glass being employed to make the microtapes, but as previously pointed out must be between the softening and flow point of the glass. For example, with a soda-lime glass the maximum chamber temperature should be maintained at around 1550° F., with borosilicate glass a temperature of around 1800° F. should be maintained, for alumina borosilicate—1600° F., and for alumino silicate—1900° F. A thermocouple, not shown, is provided to accurately control the temperature of the heating elements to provide the requisite heating chamber temperatures.

As shown in FIG. 5, the furnace is formed of suitable insulating and heat resistant material, such as refractory brick provided with openings at the top and bottom for insertion and withdrawal respectively of the preform and filament. Heat is generated by tubular heating elements 14 disposed adjacent the lower end of the chamber. The heating elements may be in the form of rods with their axes disposed in parallel relation to the major dimension of the preform. A seal, such as a graphite disc 30, disposed at the upper end of the furnace 12, is provided with a suitable opening to slidably receive the preform 8. The seal prevents upward escape of hot air from within the furnace and thus minimizes the "chimney effect" within the heating zone. As a result, temperatures in the furnace can be accurately controlled. This is a most important consideration since temperature changes cause changes in the cross sectional size of the filament; this is a condition known as "flutter."

At the lower opening of the furnace, as shown in FIG. 5, a cooler 32 is provided to effect rapid cooling of the glass filament at the instant attenuation is completed and also to minimize chimney effect within the furnace.

The furnace design shown has been found to provide a suitable gradual increase in temperature of a given point on the preform as it is moved downward through the furnace. The maximum effective temperature is attained between the heating rods where final attenuation takes place. Furnace temperatures may be changed, depending upon the type of glass being employed, but a temperature gradient which has proved suitable is shown in FIG. 5 of the drawings. In FIG. 6 is shown a curve illustrative of the time-temperature product of a point on the preform as it moves through the furnace. Attempts had been made to make microtape using a conventional narrow zone heater, but these resulted in the formation of undesirable edge beads on the filament. As a result, it was discovered that an increase in furnace length to a distance not less than the preform's major dimension eliminated the edge bead problem. For example, a furnace length of 4–5 inches for the preform 8, 3 inches in width, produced good results.

As indicated above, the preform is moved slowly downward into the furnace by the feed mechanism 11, and the filament is withdrawn at the lower end by the takeup mechanism 18 at a speed of between 200–500 feet per minute.

The take away speed is adjusted to maintain a constant microtape width. Thus, for example, using a soda-lime glass preform having a width $w$, as shown in FIG. 8, of approximately 3 inches and a thickness $t$ of about .050 a microtape was produced having a width to thickness ratio of about 37–1 and a thickness of approximately .0004 of an inch. The tape width may be monitored by a microscope disposed below the furnace and speed of the motor 20 adjusted to maintain the desired microtape size.

Application of resin to the microtape filament is accomplished, as shown in FIG. 7, intermediate the furnace and the takeup mechanism. While in carrying out this invention, a standard thermosetting resin system may be employed, such for example as an Epon 828 filament winding epoxy system, it has been found preferable to combine with such a standard epoxy system a second resin to provide, in minimum, thicknesses, a resilient resin bond. Suitable resins for this purpose are polyglycol diepoxide resins, having an epoxide equivalent of 175–205 and a viscosity of 30–60 cps. at 25° C., of the basic polyepoxide system. Using a polyglycol diepoxide resin in an amount of 30–40% by weight of the epoxy resin, it has been found that even with minimum resin layers between microtapes, an excellent resilient bond is achieved.

Since microtapes can be accurately and closely packed to form glass-resin composite structures characterized by minimum resin content it has been found that these structures are remarkably flame retardant as compared with conventional structures using round filaments.

By the method disclosed, microtapes of almost any cross section can be provided by merely fabricating a gross preform of the same shape.

Figure 12:
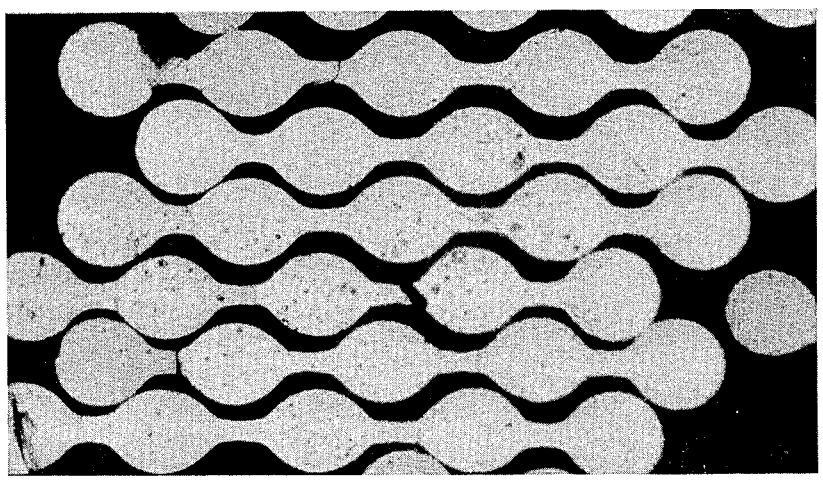

In FIG. 12 is shown, for example, a corrugated microfilament which was formed from a preform consisting of a glass plate 40 in FIG. 10, with a number of solid glass rods 44 disposed on the surface of the glass. The rods may be temporarily held in place on the plate by the use of a suitable adhesive 46, such as cellulose acetate adhesive which burns off during attenuation.

Microtape filaments having ridged or grooved surfaces, such as the filament shown in FIG. 12, are ideally suited to solve the problems of peeling and shear between layers of reinforcing fibers. Reference to FIG. 12 clearly demonstrates that layers of these fibers may be meshed together to provide structures with mechanical properties not heretofore attainable using round filaments.

Figure 13:
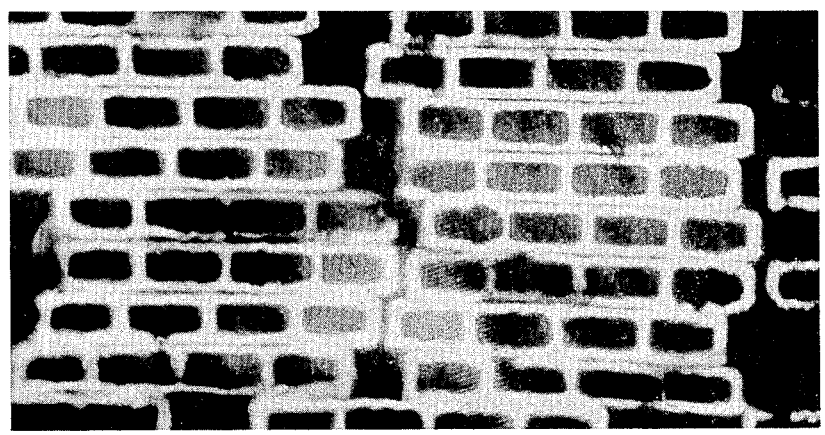

A hollow microtape filament is shown in FIG. 13. This was made by attenuation from a preform formed by cementing together a number of glass plates to obtain the desired configuration. The hollow microtape has the advantage of providing a minimum density glass-reenforced structure.

It will be apparent from FIGS. 11-13 that there is no limit to the type of reenforcing filaments and structures which may be made in accordance with this invention. There is also no limit to the utility of these microtape filaments, since they may be used anywhere that conventional round filaments are used. Moreover, they have the added advantages of producing structures of high modulus, reduced permeability and improved flame retardant characteristics, and are well suited for tubular products including pipe, conduit and vessels or containers.

While the above disclosure has illustrated the invention using a single filament, it will be apparent that this invention lends itself to multifilament production. Thus each filament may be wound to provide a single layer in a multi-layered structure with the desired overlap and/or intermeshing if corrugated microtapes are being fabricated. Thus such a multilayer structure could be produced in a single pass of the winding mandrel beneath the furnace.

Having thus described the invention, what is claimed is:

1. Glass-resin tubular product having a wall structure comprising a thermosetting resin reenforced by layers of filament glass, said filament glass being characterized by a width to thickness ratio of not less than 10 to 1, said filament glass being in layers with the filaments in each layer being disposed in edge-to-edge abutting relation and staggered to overlie the abutting edges of the underlying layer to thereby provide a leakage path through said wall structure of said product which is not less than 12 times the thickness of said wall.

2. Glass-resin tubular product as set forth in claim 1 in which said resin is a combination epoxy resin and polyglycol diepoxide resin and said ratio is in the range of 20–50 to 1.

3. Method of making glass-resin composite structures comprising the steps of advancing a glass preform through a chamber heated to a temperature between the softening and flow temperatures of the glass preform, said preform being characterized by a width substantially greater than its thickness, forming from the softened preform by attenuation, a glass microtape having the same cross sectional configuration as the preform and characterized by a thickness of from .0002 to .004 of an inch and a width to thickness ratio of from 10 to 50 to 1, applying a thermosetting resin, and winding said microtape in contiguous edge-to-edge relation and in successive layers, in overlapping relation on a mandrel, such that a wall structure is provided with a leakage path through the resin bonding said filaments of not less than 12 times the wall thickness.

4. Method of making glass-resin composite structures as set forth in claim 3 in which said thermosetting resin is applied to the microtape intermediate said mandrel and said heating chamber.

5. Method of making a multi-layered glass-resin composite structure of low gas permeability comprising the steps of forming, by preform attenuation, a relatively wide, thin microtape glass filament, applying thereto a thermosetting resin, and winding the filament onto a mandrel with the adjacent turns of said microtape in one layer in contiguous edge-to-edge relation and in successive layers, the turns of said microtapes being offset to provide multi-layered structure with the microtape of one layer disposed to overlie the abutting edges of the microtape in the underlying layer.

References Cited
UNITED STATES PATENTS

| | | | |
|---|---|---|---|
| 2,939,761 | 6/1960 | Stein | 65—3 |
| 2,992,517 | 7/1961 | Hicks. | |
| 2,995,417 | 8/1961 | Riedel | 65—1 |
| 3,010,146 | 11/1961 | Warther | 161—177 |
| 3,037,241 | 6/1962 | Bazinet et al. | 65—13 |

DONALL H. SYLVESTER, *Primary Examiner.*

ROBERT L. LINDSAY, JR., *Assistant Examiner.*

U.S. Cl. X.R.

65—2, 3, 13; 117—126; 161—177